(12) United States Patent
Michels

(10) Patent No.: US 6,595,185 B2
(45) Date of Patent: Jul. 22, 2003

(54) HEATABLE THROTTLE DEVICE FOR INTERNAL COMBUSTION ENGINES

(75) Inventor: Markus Michels, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/103,816

(22) Filed: Mar. 25, 2002

(65) Prior Publication Data

US 2002/0152988 A1 Oct. 24, 2002

(30) Foreign Application Priority Data

Mar. 23, 2001 (DE) .......................................... 101 14 221

(51) Int. Cl.$^7$ .................................................. F02P 9/00
(52) U.S. Cl. ...................... 123/337; 123/399; 123/545
(58) Field of Search .................................. 123/337, 399, 123/545, 319, 400, 546, 543

(56) References Cited

U.S. PATENT DOCUMENTS

| | | | | |
|---|---|---|---|---|
| 1,354,484 A | * | 10/1920 | Hoyt | 123/545 |
| 4,302,407 A | * | 11/1981 | Hartel et al. | 261/130 |
| 4,420,439 A | * | 12/1983 | Hartel et al. | 261/142 |
| 4,434,772 A | * | 3/1984 | Hartel et al. | 123/549 |

* cited by examiner

Primary Examiner—Bibhu Mohanty
(74) Attorney, Agent, or Firm—Ronald E. Greigg

(57) ABSTRACT

A device for mixture preparation in internal combustion engines, in which a fluid flow flows through a flow cross section of a bore, and the fluid flow is meterable by means of an actuatable throttle element, which is pivotable in a receiving bore of a housing. Between a wall of the bore and the outer circumference of the housing, hollow chambers for a heating or cooling medium are embodied in this housing.

11 Claims, 6 Drawing Sheets

HEATABLE THROTTLE DEVICE FOR INTERNAL COMBUSTION ENGINES

BACKGROUND OF THE INVENTION

1. Field of the Invention

In internal combustion engines used in vehicles, a throttle device is currently used, which as a rule is in the form of a circular flap received in the intake system of the engine, and which meters the volumetric flow of fresh air to be aspirated that is required for the combustion. Because of the high flow velocities of the fresh-air flow, and at low outdoor temperatures, water vapor contained in the fresh air can condense on the wall of the pipe; upon further cooling, ice can form in the interior of the fresh-air line, which can impair the smooth operation of a throttle valve considerably.

2. Prior Art

German Patent Disclosure DE 33 46 167 A1 relates to a throttle valve connector in which a throttle valve is disposed on the shaft, which in turn is fixed on both ends in the connector housing by slide bearings. These slide bearings are each pressed into a shaft bore and have end faces, toward the throttle valve, which are curved to suit the wall of the housing bore and form a part of this wall. Because of this design of the slide bearings, the leakage rate of this throttle valve connector in DE 33 46 167 A1 is extremely slight.

German Patent Disclosure DE 198 43 771 A1 relates to an electric-motor final control element, in particular with a throttle valve. An electric-motor final control element is disclosed, with a housing and with an electric motor disposed on a drive side inside the housing for driving a movable element disposed in the housing. This movable element is in particular a throttle valve, and according to the disclosure it is provided that a separate electronic housing for receiving control and/or evaluation electronics can be secured to the housing. On the one hand, in particular this avoids the projection of electromagnetic interference to the inside, and on the other, mass-produced electronic final control elements that do not require any control unit can continue to be used without changes in shape being required for the production of the final control element.

Finally, from German Patent Disclosure DE 29 49 041 B1, a heater for mixture preparation in mixture formers has been disclosed. This version involves a heater for mixture preparation in internal combustion engine mixture formers, with a pipe wall that defines a main flow and with a main throttle member downstream, as well as a fuel distribution device in the upstream part of a mixing chamber. The latter is embodied, over a part of this length, as a double wall of a heat exchanger, with an annular hot water chamber that has a water inlet connector on one end and a water outlet connector on its other end. The heat exchanger communicates with a coolant loop via a thermally controlled ON valve that opens at elevated temperatures. When the ON valve is blocked, and when the coolant loop is turned off, the heat exchanger is located above the coolant level. The inner wall of the heat exchanger, adjoining the main flow path of the mixture former, comprises an electric heating resistor material and is electrically connected to a voltage source via an electrical switch member that is thermally controlled as a function of the coolant temperature and that opens beyond a certain, relatively high water temperature.

SUMMARY OF THE INVENTION

The advantages of the embodiment according to the present invention are considered to be above all that the conduits and hollow chambers, in which a heating medium flows, can already be fabricated in the process of producing the throttle device for an internal combustion engine, so that metal-cutting machining of the solid material comprising the throttle housing is unnecessary. If heating conduits on the throttle housing are produced later by being drilled open or milled from solid material, then the course of the heating conduits must necessarily match the geometry of the housing, which under some circumstances can mean that only uneven heating of the wall of the throttle plate bore is attainable, because some regions of the throttle housing, made of solid material, remain that have a relatively great wall thickness.

With the embodiment proposed according to the invention, the heating conduits are shaped during production in the region between the outer wall and the throttle valve bore in such a way that they allow the passage of a heating medium both parallel to the flow direction of the fresh-air flow and—if necessary—perpendicular to the flow direction of a fluid flow flowing in the flow cross section. In an advantageous feature of the embodiment of the invention, the individual hollow chambers between the outer wall of the throttle device and the throttle valve bore can be joined together by lowering the ribs that subdivide the hollow chambers, so that by means of overflow processes at the wall of the throttle valve bore, a uniform temperature profile can develop. Upon assembly, the hollow chambers on the open side are sealed off, for instance by means of a continuous rib or by being mounted on a further component. If the throttle housing is produced in the form of cast parts, then in the casting the inlet and outlet connections necessary for connecting the heater can be positioned from outside relative to the hollow chambers in such a way that they define the surface of the throttle valve wall that is to be heated. The heating surface can be varied by placing the connections elsewhere.

With the arrangement of hollow chambers or heating conduits, made in accordance with the embodiment of the invention, between the outer wall of the throttle housing and the wall of the throttle valve bore, a uniformly proceeding temperature clamp or control, or tempering, of the wall of the throttle valve bore can be attained. Per hollow chamber segment, a tempering of the wall of the throttle valve bore can be accomplished that corresponds to the location of the inlet or outlet connections of the heating medium. The wall of the heating surfaces, that is, the boundary walls of the throttle valve bore, which are embodied with an extremely thin wall thickness, make a fast response time possible and thus a fast change of temperature at the wall of the throttle valve bore.

BRIEF DESCRIPTION OF THE DRAWINGS

The invention is described in further detail below in conjunction with the drawings, in which.

DESCRIPTION OF THE PREFERRED EMBODIMENTS

Figure 1:
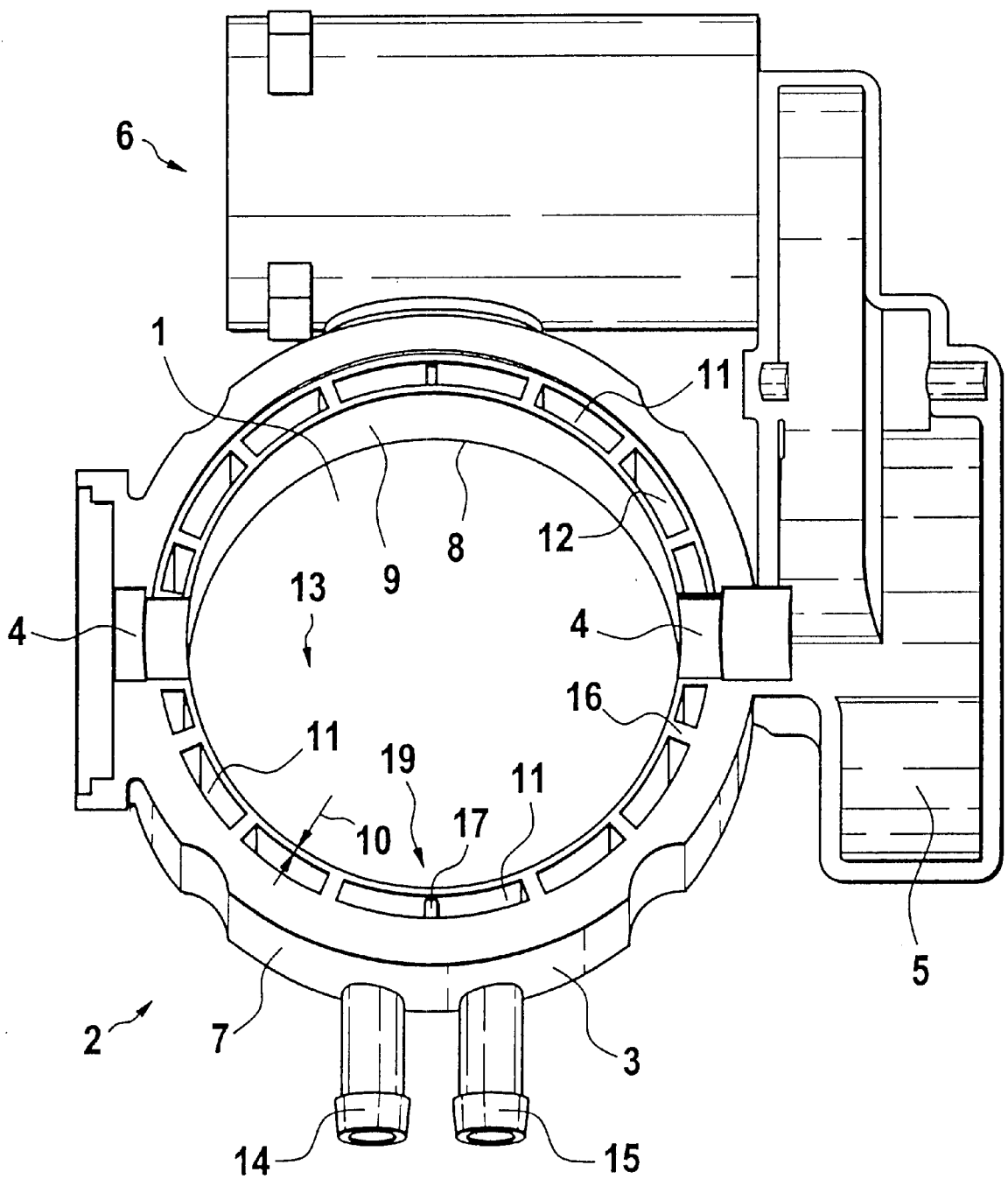
FIG. 1 is a perspective view showing the heating conduits, extending parallel to the flow direction of the fluid flow, on the circumference of the throttle valve bore.

The view in FIG. 1 shows the hollow chamber, extending parallel to the flow direction of the fluid flow, on the circumference of a throttle valve bore. In this view, a housing half-shell 3 of a throttle valve housing 2 is shown. A free flow cross section 1 of a throttle valve bore 8 is bounded by an inner wall 9. Two opposed throttle shaft bearing bores 4 are provided on the housing half-shell 3 of the throttle valve housing 2, into which bores a throttle valve, not shown here, is inserted. The throttle valve is received on a throttle valve shaft, also not shown here, which is actuatable by means of an adjusting drive mechanism. For receiving the adjusting drive mechanism, a receiving chamber 5 is provided on the housing half-shell 3; also located on the housing half-shell 3, in the view of FIG. 1, is a housing chamber 6, which receives the drive mechanism for adjusting the throttle valve. Between the outer wall 7 of the housing half-shell 3 and the inner wall of the throttle valve bore 8, hollow chambers 11 are embodied on the circumference of the throttle valve bore 8, distributed essentially in the flow direction 13 of a fluid flow. The hollow chambers 11 can be subjected to a heating or cooling medium via an inlet 14 or an outlet 15 as applicable. The inner wall 9 is embodied with a slight wall thickness 10, to assure an optimal heat transfer. Between the individual hollow chambers 11, which are embodied on the circumference of the throttle valve bore 8 in the bottom housing shell 3, individual ribs 16 and countersunk ribs 17 are formed.

The housing half-shell 3 of a throttle valve housing 2 in the view of FIG. 1, and the chambers 5 and 6 provided thereon for receiving drive or adjusting drive mechanism elements are preferably manufactured by a casting process or by plastic injection-molding, either in single-component or two-component injection-molding. These methods optimally make it possible to embody the hollow chambers as close as possible to the inner wall 9 defining the throttle valve bore 8, so that the heating or cooling medium flowing through the hollow chambers 11 can be brought directly to the wall 9 to be heated or cooled, which defines a flow cross section 1.

Figure 2:
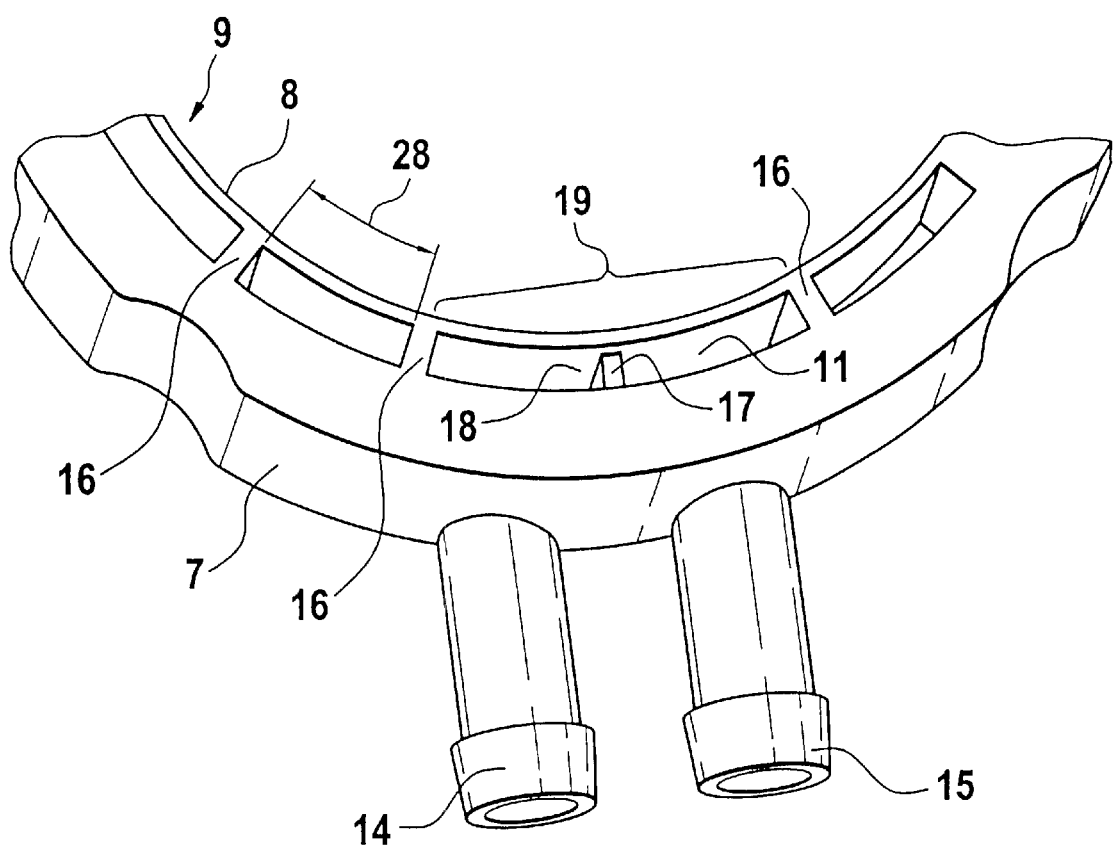
FIG. 2 shows a heatable surface region on the circumference of the throttle valve bore.

A heatable surface region on the circumference of a throttle valve bore can be seen in more detail in the view in FIG. 2.

In the view of FIG. 2, a heatable surface region 19 of the inner wall 9 of the throttle valve bore 8 is defined by two ribs 16. Located between the two ribs 16 is a countersunk rib 17, which in comparison to the ribs 16 embodied as continuous defines an overflow opening or overflow conduit 18. Via the inlet 14 provided on the outer circumference 7, a heating or cooling medium enters the hollow chambers 11, flows through them perpendicular to the plane of the drawing, and overflows, through the overflow conduit 18 formed by the countersunk rib 17, into the hollow chamber 11 located adjacent to the countersunk rib 17. From that hollow chamber, the heating or cooling medium flows out again via the outlet 15. The hollow chambers that form the heatable surface region are optimally designed in such a way that a heating or cooling face, extending as optimally as possible along the curved contour of the inner wall 9 of the throttle valve bore 8, can be attained for the medium passing through a throttle valve bore 8 in the free flow cross section 1. By means of the ribs 16 extending continuously on both sides of the hollow chambers 11, which chambers are located in the region of the inlet 14 and outlet 15, the heatable surface region of the inner wall 9 is limited to the hollow chambers 11 that can be supplied with a heating or cooling medium through the inlet 14 and outlet 15. Reference numeral 28 identifies the width of one hollow chamber 11, which is disposed adjacent to the rib 16, next to the inlet 14 for the heating or cooling medium. Depending on the location of the inlet and outlet 14, 15, the heatable surface region 19 of the inner wall 9 of the throttle valve bore 8 can be defined. The heat transfer, if the inner wall 9 of the throttle valve bore 8 is embodied with a slight wall thickness 10, is effected essentially by thermal conduction, and this heat transfer takes place very fast, because of the slight wall thickness 10 of the inner wall 9 of the throttle valve bore 8.

Figure 3:
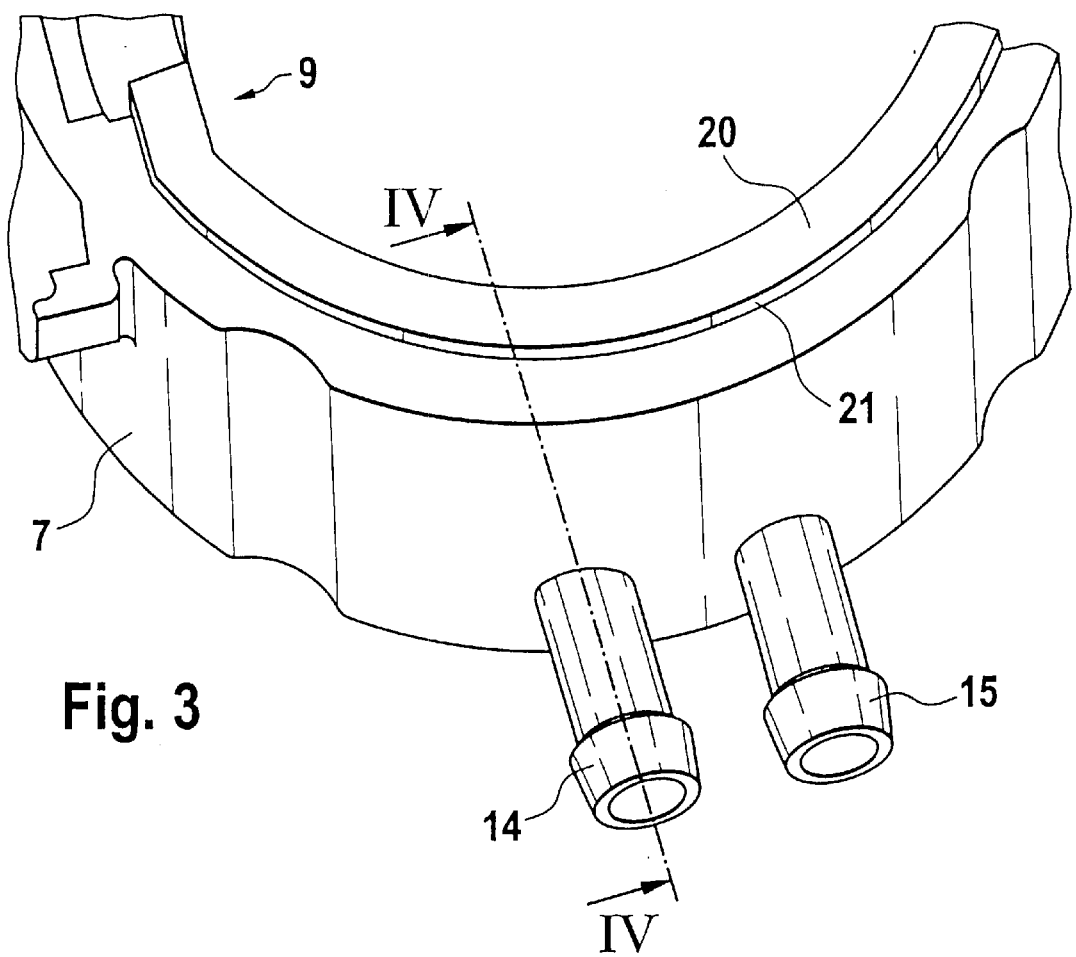
FIG. 3 is a perspective view of a housing half-shell, with the hollow chambers for the sealing lip that closes the heating medium path.

FIG. 3 shows a perspective view of a housing half-shell with a sealing element that closes the heating conduits.

In the view in FIG. 3, the hollow chambers 11, which in the views of FIGS. 1 and 2 are open, are closed by means of a sealing element 20 that extends annularly around the housing half-shell 3, the latter being shown in section. The one sealing lip 21, embodied on the preferably annularly embodied sealing element 20, rests sealingly on a plane end face of the housing half-shell 3. The inlets and outlets 14, 15 that define a heatable surface region 19 are embodied on the outer wall 7 of the housing half-shell 3 of a throttle valve housing 2. These inlets and outlets can be embodied as connections that can be plugged into the outer wall 7, but the possibility also exists of embodying the inlet 14 and outlet 15 directly in the course of casting the housing half-shell 3 or in the injection-molding of the housing half-shell 3, by creative shaping processes in this way.

Figure 4:
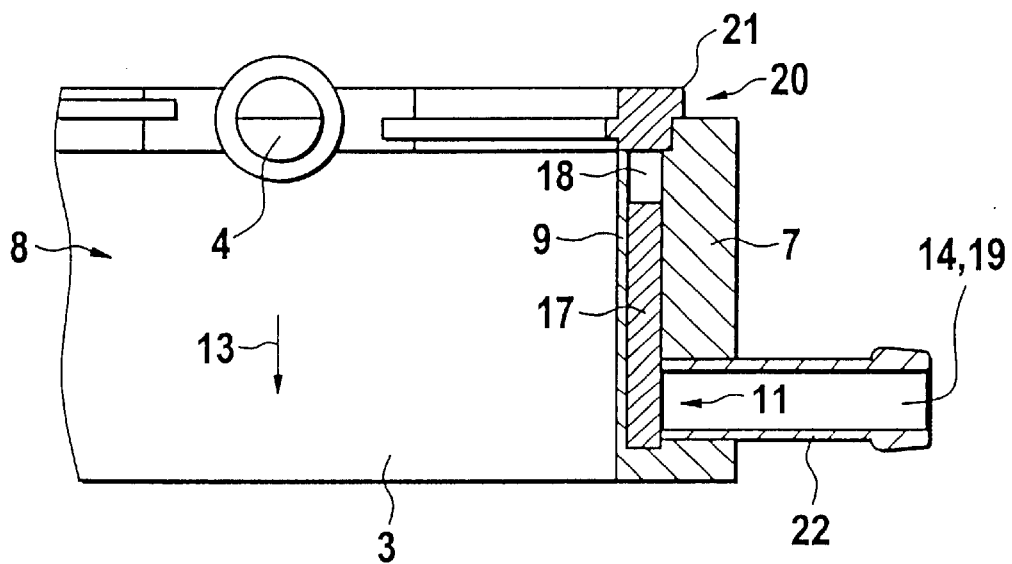
FIG. 4 is a cross section through the view of FIG. 3.

The view in FIG. 4 is a cross section through the view of the housing half-shell in FIG. 3.

A fluid flow flows in the flow direction 13 through the housing half-shell 3; the volumetric flow of the fluid flow passing through the free flow cross section 1 of the housing half-shell 3 is variable by means of a throttle valve element supported pivotably in the throttle valve bore 8. Inlets and outlets 14, 15 (for instance formed by inserted connectors 22) are integrated into the wall of the housing half-shell 3; for the most part they penetrate the wall of the housing half-shell 3, and they communicate with hollow chambers 11 located in the wall. The hollow chambers 11 are separated from one another, in the sectional view in FIG. 4, by individual ribs 16 and 17. As shown in FIG. 4, a countersunk rib 17, in its upper region oriented toward the sealing element 20, uncovers an overflow conduit 18, by means of which a heating or cooling medium entering a hollow chamber 11 via the inlet 14 can overflow into the hollow chamber segment 12, adjacent to the countersunk rib 17, at the circumference of the throttle valve bore 8. Depending on the spacing of the inlet 14 and outlet 15 on the outer wall 7 of the housing half-shell 3, a heatable surface region 19 is established that in the circumferential direction covers a larger or smaller angular range. In addition to sealing of the hollow chambers 11 and chamber segments, 12 and overflow conduits 18 in the region of countersunk ribs 17 at the circumference of the throttle valve bore 8, the hollow chambers 11 and segments, 12 can also be sealed off by adjoining annular components, without the necessity of providing a separate, essentially annularly embodied sealing element 20. A sealing lip 21, which in the radial direction covers the hollow chambers 11 and segments, 12 and thus seals them off both axially radially relative to the flow direction 13 of the fluid flow through the free flow cross section 1 of the throttle valve bore 8 is located on the sealing element 20.

Figure 5:
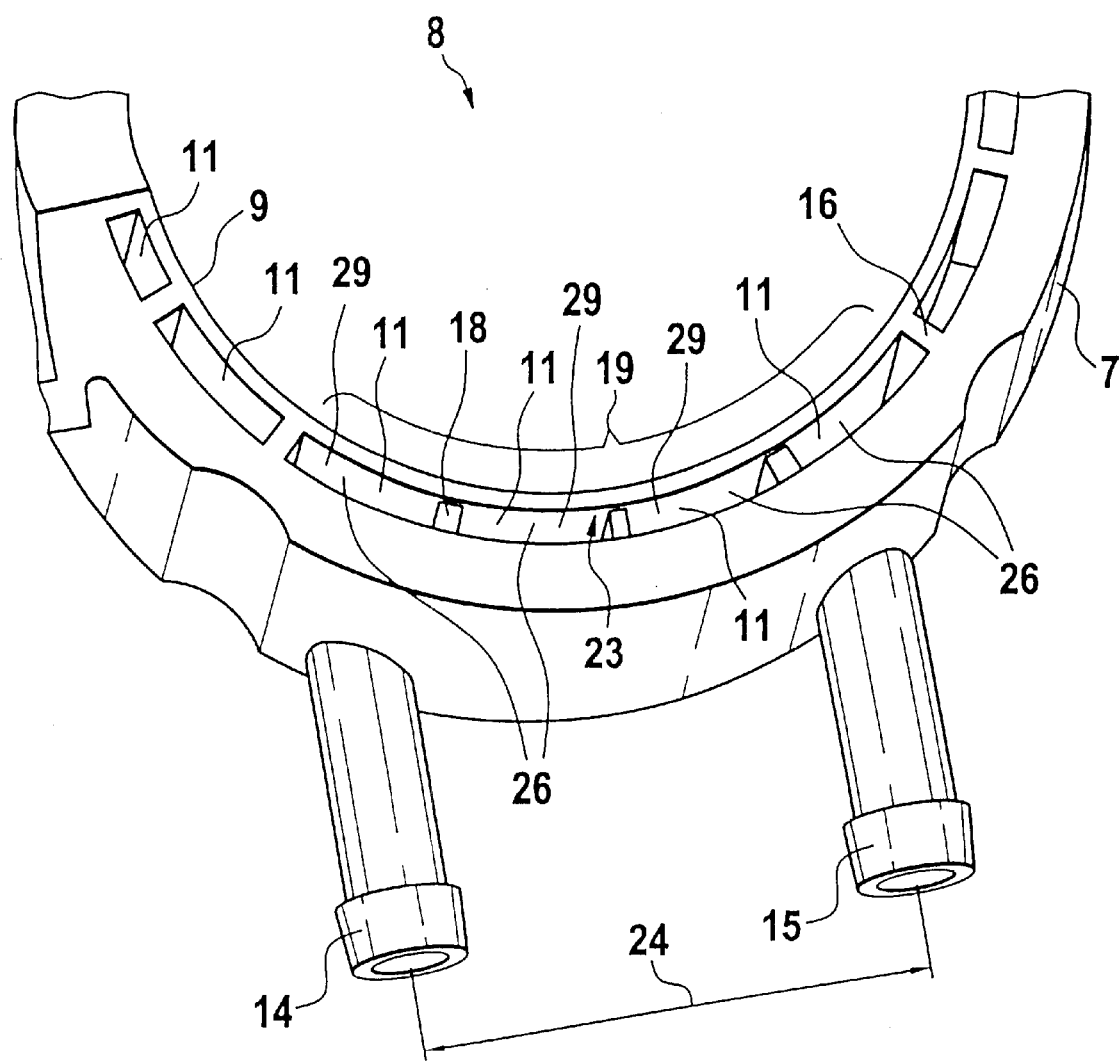
FIG. 5 is a variant embodiment of a bottom shell of the half shell of the throttle device, with a widened heating region in the circumferential direction.

The view in FIG. 5 shows a variant embodiment of a throttle device of a throttle housing half-shell with an expanded heating and cooling region, in the circumferential direction.

In the view of FIG. 5, the inlet 14 and the outlet 15 are oriented with a widened spacing 24 from one another on the outer wall 7 of a housing half-shell 3. By means of this variant embodiment, a heatable surface region, also identified by reference numeral 19, that covers a larger angular range can be attained along the inner wall 9 of the throttle valve bore 8. By way of the inlets and outlets 14, 15, provided at a widened spacing 24 from one another on the outer circumference 7, four hollow chambers 11 located next to one another can be heated and cooled. Each of the outer hollow chambers 11 are defined by continuous ribs 16, while further countersunk ribs 18 are provided between the hollow chambers 11. By the inflow of a heating or cooling medium through the inlet 14, the heating or cooling medium is capable of flowing, via the overflow conduits 18 embodied in the further countersunk ribs 25, into the adjacent hollow chambers 11 until it flows into the hollow chamber 11 that is defined by a continuous rib 16. From this hollow chamber 11, the heating or cooling medium flows out again via the outlet 15. The heat transfer takes place from the heating or cooling medium via the surface regions 26, remote from the inner wall 9, of the hollow chambers 11. Because of the slight wall thickness 10 with which the inner wall 9 of the throttle valve bore 8 is embodied, an optimal heat transfer from heating or cooling medium that flows through the hollow chambers 11 at the circumference of the throttle valve bore to the inner wall 9 of the throttle valve bore is achieved, so that depending on the disposition of the inlets and outlets 14 and 15 in FIG. 2 or FIG. 5, a variably large heating zone 19 extending in the circumferential direction can be attained. By means of producing hollow chambers 11 during the shaping of the bottom housing shell 3, the configuration of the hollow chambers 11 can be adapted optimally to the wall curvature 23 of the inner wall 9 of the throttle valve bore 8.

Figure 6:
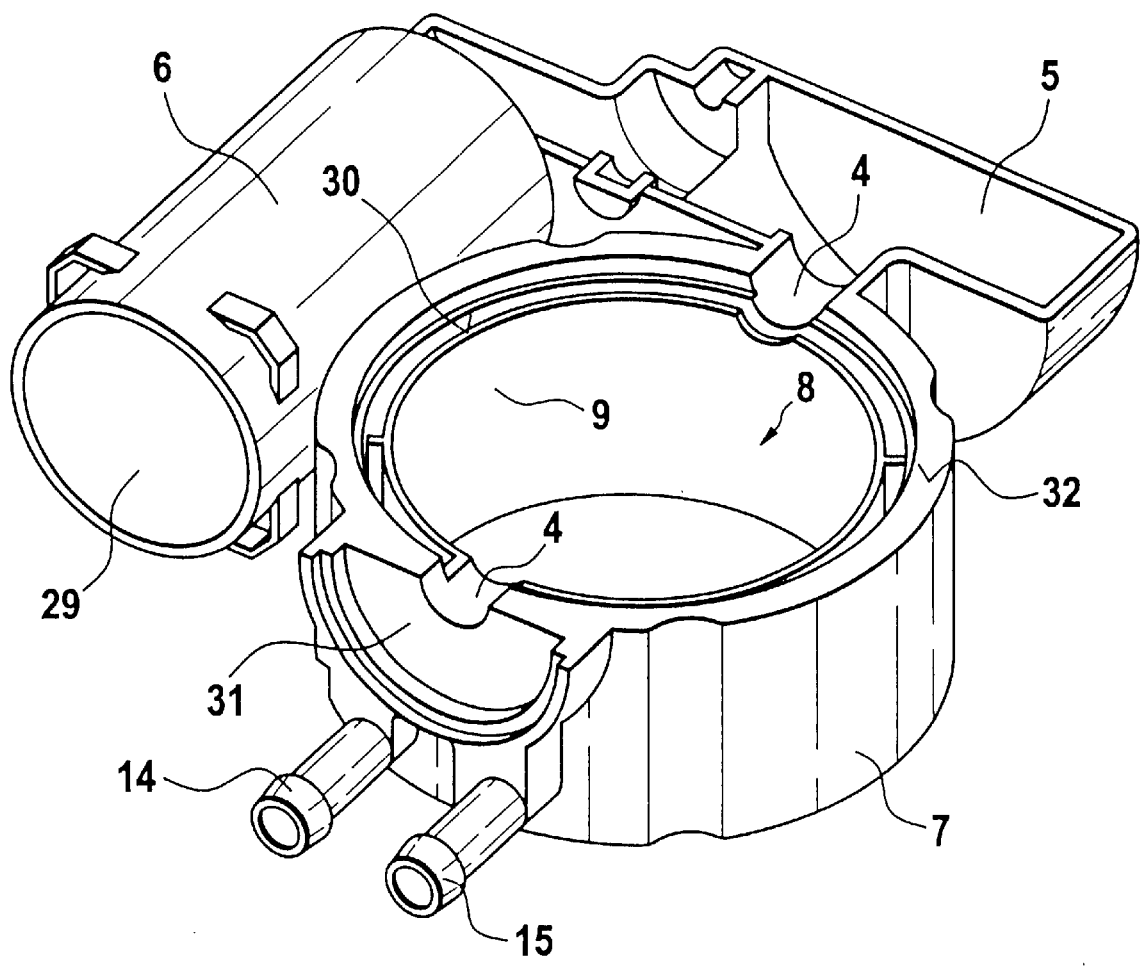
FIG. 6, in perspective, shows a housing half-shell of the throttle device.

The view in FIG. 6 shows a bottom housing shell of a throttle device in perspective. From this view, it can seen that above inlets and outlets 14, 15, injection-molded or cast onto the outer circumference 7 of the bottom housing shell 3, a bearing 31 for a throttle valve shaft to be received in the throttle shaft bearing bore 4 is provided. On the side of the bottom housing shell 3 opposite the bearing 31, a receiving chamber 5 (see the view in FIG. 1) is cast or injection-molded on, and in it, adjusting drive mechanism elements are provided, which effect a pivoting motion of the throttle valve shaft with a throttle valve. In a housing chamber 6, also injection-molded on, which is accessible via an opening 29, the drive mechanism for moving the throttle valve, which mechanism acts on the adjusting drive mechanism 5, can be received. Reference numeral 32 designates the end face of the bottom housing shell, onto which, after the throttle valve is mounted in the throttle valve shaft bearings 4, an upper housing shell, not shown here, of the throttle device is placed.

Figure 7:
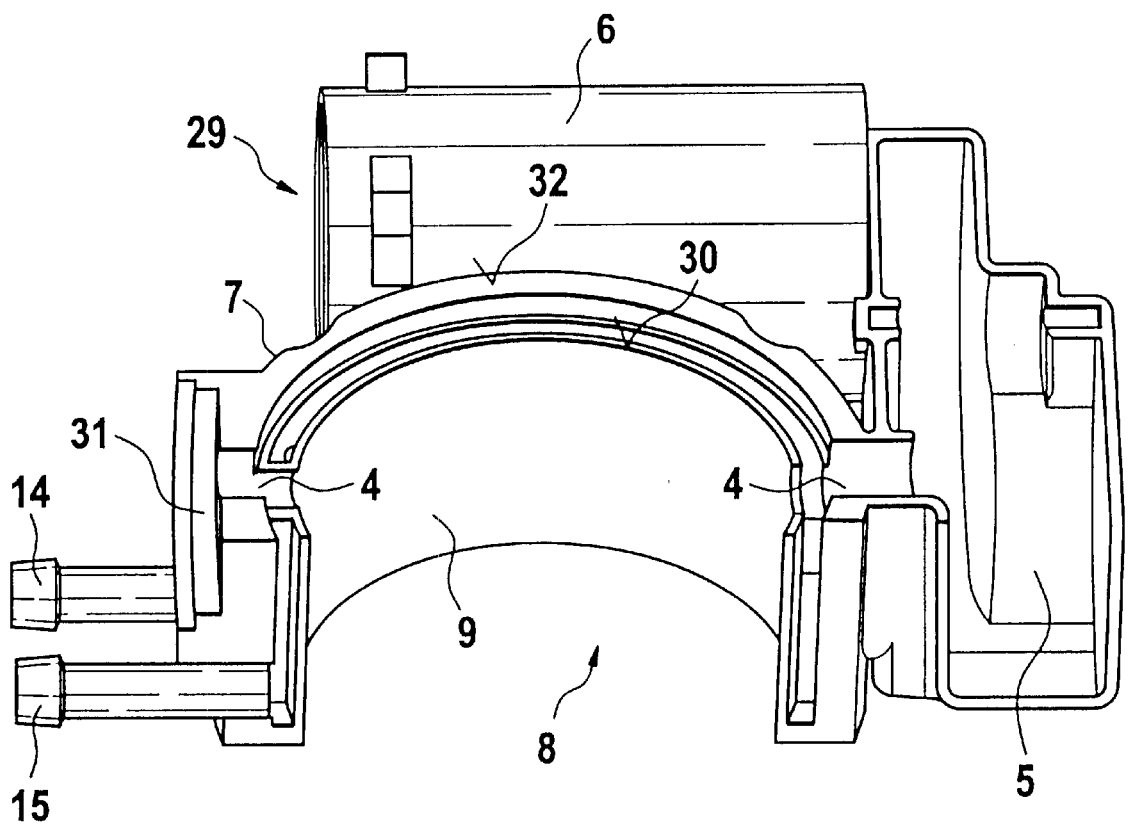
FIG. 7 is a sectional view of the device of FIG. 6.

In the view in FIG. 7, the inlet 14 and outlet 15 are cast or injection-molded into the outer walls 7 of the bottom housing shell 3 and are thus integrated with it.

From the view in FIG. 7, furthermore, the mounting chambers 5 and 6 for the drive components, already shown in FIG. 6, can be seen for a throttle valve, not shown here, that is pivotable in the free flow cross section 1 of the throttle valve bore 8. By shifting the inlet 14 and/or outlet 15 for the heating or cooling medium to a different position, the surface 19 to be heated can be shifted along the inner wall 9 of the throttle valve bore 8. Along with the embodiment of the hollow chambers 11 carrying the heating or cooling medium parallel to the flow direction 13 of a fluid flow through the throttle valve bore 8, the hollow chambers can also be embodied so that they bypass the throttle valve bore 8.

The foregoing relates to preferred exemplary embodiments of the invention, it being understood that other variants and embodiments thereof are possible within the spirit and scope of the invention, the latter being defined by the appended claims.

I claim:

1. In a device for mixture preparation in internal combustion engines, in which a fluid flow flows through a flow cross section (1) of a bore (8), and the fluid flow is meterable by means of an actuatable throttle element, which is pivotable in a receiving bore (4) of a housing (2), the improvement wherein, between a wall (9) of the bore (8) and the outer circumference of the housing (2), hollow chambers (11) for a heating or cooling medium are embodied in the housing, wherein the hollow chambers (11) are separated from one another by ribs (16, 17).

2. The device of claim 1, wherein the hollow chambers (11) extend in the housing (2) in the flow direction (13) of the fluid flow.

3. The device of claim 1, wherein the hollow chambers (11) extend in the housing (2) perpendicular to the flow direction (13) of the fluid flow.

4. The device of claim 1, wherein countersunk ribs (17, 25) are embodied between the hollow chambers (11) of a heatable surface region (19).

5. The device of claim 4, wherein the countersunk ribs (17) between the hollow chambers (11) form an overflow conduit (18), which allows a passage of the heating or cooling medium from one hollow chamber (11) into at least one adjacent hollow chamber (11).

6. The device of claim 4, wherein, between the hollow chambers (11) of a heatable surface region (19), a suitable number of countersunk ribs (25) is provided, through which an overflow of the heating or cooling medium takes place.

7. The device of claim 4, wherein the length of the heatable surface region (19) is defined by inlets or outlets (14, 15) recessed out of or cast or injected onto the outer circumference (7) of the housing (2).

8. The device of claim 5, wherein the hollow chambers (11) for the heating or cooling medium are sealed off in the housing (2) by a sealing lip (20, 21) in such a way that an overflow of the heating or cooling medium in the radial direction through the overflow conduits (18) of the countersunk ribs (17, 25) is made possible.

9. The device of claim 7, wherein the inlets and/or outlets (14, 15) are integrated with the housing (2).

10. The use of the device of claim 1, in a throttle valve bore (8) of the intake system of an internal combustion engine.

11. A method for producing a throttle valve housing (12) of a throttle valve device in the intake system of an internal combustion engine, comprising casting or injection-molding the throttle valve housing (2) with hollow chambers (11) separated from one another by ribs (16, 17) integrally formed therein for the passage of a heating or cooling medium, the hollow chambers extending in the flow direction (13) of a fluid flow.

* * * * *